United States Patent
Shi

(10) Patent No.: US 12,028,810 B2
(45) Date of Patent: Jul. 2, 2024

(54) METHOD FOR WUS MONITORING AND TERMINAL DEVICE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 337 days.

(21) Appl. No.: 17/549,568

(22) Filed: Dec. 13, 2021

(65) Prior Publication Data
US 2022/0104134 A1    Mar. 31, 2022

Related U.S. Application Data

(63) Continuation of application No. PCT/CN2019/107244, filed on Sep. 23, 2019.

(51) Int. Cl.
*H04W 52/02* (2009.01)
*H04W 76/28* (2018.01)

(52) U.S. Cl.
CPC ... *H04W 52/0232* (2013.01); *H04W 52/0216* (2013.01); *H04W 76/28* (2018.02)

(58) Field of Classification Search
CPC ......... H04W 52/0232; H04W 52/0216; H04W 52/0229; H04W 52/0225; H04W 76/28; H04W 68/005; Y02D 30/70
See application file for complete search history.

(56) References Cited

U.S. PATENT DOCUMENTS

2022/0022137 A1*  1/2022  Xue ................. H04W 24/08
2022/0150834 A1*  5/2022  Li .................. H04W 52/0235

FOREIGN PATENT DOCUMENTS

| CN | 109314869 | 2/2019 |
| CN | 109952789 | 6/2019 |
| CN | 110199550 | 9/2019 |
| WO | 2018175760 | 9/2018 |
| WO | 2018202693 | 11/2018 |
| WO | 2018202751 | 11/2018 |
| WO | 2018204799 | 11/2018 |
| WO | 2018208956 | 11/2018 |
| WO | WO-2020063896 A1 * | 4/2020 |

OTHER PUBLICATIONS

CNIPA, First Office Action for CN Application No. 202111277181.9, Jan. 19, 2023.
(Continued)

*Primary Examiner* — Farid Seyedvosoghi
(74) *Attorney, Agent, or Firm* — Hodgson Russ LLP

(57) ABSTRACT

A method for wake-up signal (WUS) monitoring and a terminal device are provided. The method for WUS monitoring includes the following. A terminal device determines an operation state of a WUS according to a type of a discontinuous reception (DRX) cycle. The terminal device performs an operation corresponding to the operation state. The type of the DRX cycle includes a first DRX cycle and a second DRX cycle, where the first DRX cycle is longer than the second DRX cycle.

16 Claims, 6 Drawing Sheets

(56) References Cited

OTHER PUBLICATIONS

WIPO, International Search Report for PCT/CN2019/107244, Jun. 15, 2020.
Interdigital, "Report from session on Legacy LTE, Rel-15 LTE, and NR NTN SI, NR power saving SI," 3GPP TSG-RAN WG2 Meeting #106, R2-1911515, May 2019.
Samsung, "PDCCH-based power saving signal/channel", 3GPP TSG RAN WG1 #97, R1-1906980, May 2019.
CATT, "Offline Discussion Summary of PDCCH-based Power Saving Signal/Channel", 3GPP TSG RAN WG1 Meeting #98, R1-1909799, Aug. 2019.
OPPO, "Impacts of power saving signalling to C-DRX", 3GPP TSG-RAN WG2 Meeting #105bis, R2-1903296, Apr. 2019.
EPO, Extended European Search Report for EP Application No. 19946893.5, Apr. 13, 2022.

\* cited by examiner

METHOD FOR WUS MONITORING AND TERMINAL DEVICE

CROSS REFERENCE TO RELATED APPLICATION(S)

This application is a continuation of International Application No. PCT/CN2019/107244, filed on Sep. 23, 2019, the entire disclosure of which is incorporated herein by reference.

TECHNICAL FIELD

This disclosure relates to the field of communication, and more particularly to a method for WUS monitoring and a terminal device.

BACKGROUND

In $5^{th}$ generation (5G) new radio (NR) standardization at present, from the perspective of power saving of terminal devices, a physical downlink control channel (PDCCH)-wake-up signal (WUS) is introduced in connected mode discontinuous reception (DRX).

In other words, before a start time for a drx-onDurationTimer, a network device transmits a WUS to the terminal device, to notify the terminal device of whether to start the drx-onDurationTimer to monitor a PDCCH.

By introducing a WUS, power consumption of the terminal device can be reduced.

For example, if the network device predicts that a particular terminal device will not be scheduled in some future time, the network device can notify this terminal device not to start the drx-onDurationTimer, thereby reducing unnecessary PDCCH monitoring of the terminal device.

However, WUS monitoring of the terminal device not only increases power consumption of the terminal device, but also increases PDCCH resource overhead of the terminal device.

SUMMARY

In a first aspect, a method for WUS monitoring is provided. The method includes the following. A terminal device determines an operation state of a WUS according to a type of a discontinuous reception (DRX) cycle. The terminal device performs an operation corresponding to the operation state. The type of the DRX cycle includes a first DRX cycle and a second DRX cycle, where the first DRX cycle is longer than the second DRX cycle.

In a second aspect, a terminal device is provided. The terminal device includes a processor and a memory. The memory is configured to store computer programs. The processor is configured to invoke and execute the computer programs stored in the memory, to perform the method described in the first aspect or in any other implementation of the first aspect.

In a third aspect, a non-transitory computer readable storage medium is provided. The computer readable storage medium is configured to store computer programs which are operable with a terminal device to perform the method described in any of the first aspect.

DETAILED DESCRIPTION

The following will describe technical solutions of implementations with reference to the accompanying drawings. Apparently, implementations described herein are merely some implementations, rather than all implementations, of the disclosure. Based on the implementations described herein, all other implementations obtained by those of ordinary skill in the art without creative effort shall fall within the protection scope of the disclosure.

Figure 1:
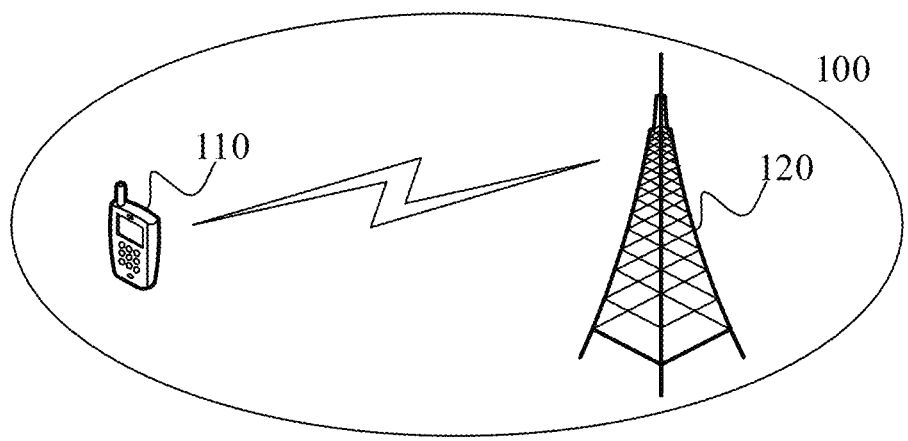
FIG. 1 is a schematic diagram of an application scenario of the disclosure.

FIG. 1 is a schematic diagram of an application scenario of the disclosure.

As illustrated in FIG. 1, a communication system 100 may include a terminal device 110 and a network device 120. The network device 120 may communicate with the terminal device 110 via an air interface. The terminal device 110 and the network device 120 support multi-service transmission.

It should be understood that, implementations herein only take the communication system 100 as an example for description, but the disclosure is not limited in this regard. In other words, technical solutions of implementations may be applied to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE time division duplex (LTE-TDD) system, a universal mobile telecommunication system (UMTS), a worldwide interoperability for microwave access (WiMAX) communication system, a new radio (NR) system, or a $5^{th}$ generation (5G) system.

Taking the 5G system as an example, technical solutions of implementations can be applied to wide-area LTE coverage and island coverage of NR. In addition, a large amount of LTE is deployed below 6 GHz (gigahertz), with few spectrums below 6 GHz available for 5G. Therefore, it is necessary to conduct research on applications of spectrum above 6 GHz in NR. However, high-frequency bands have limited coverage and are fast in signal fading. On the other hand, in order to protect early investment of mobile operators in LTE, a tight interworking mode between LTE and NR is proposed.

5G is mainly applied to: enhanced mobile broadband (eMBB), ultra-reliable low-latency communication (URLLC), and massive machine-type communication (mMTC). eMBB is aimed at obtaining multimedia content, services, and data for users and grows rapidly in demand. Because eMBB may be deployed in different scenarios, such as indoor, urban, rural areas, etc., its capabilities and requirements vary widely. Therefore, analysis of eMBB should depend on specific deployment scenarios. Typical applications of URLLC include: industrial automation, power automation, telemedicine operations, and traffic safety assurance. mMTC is typically characterized by: high connection density, small amount of data, delay-insensitive services, low cost of modules, and long service life.

Since complete NR coverage is difficult to obtain, typical network coverage modes of implementations may adopt wide-area LTE coverage and island coverage of NR. In addition, in order to protect early investment of mobile operators in LTE, a tight interworking mode between LTE and NR is proposed.

Technical solutions of implementations can be applied to various non-orthogonal multiple access technology-based communication systems, such as a sparse code multiple access (SCMA) system, a low density signature (LDS) system, or the like. The SCMA system and the LDS system may be named differently in the communication field. In addition, the technical solutions of implementations can be applied to multi-carrier transmission systems adopting non-orthogonal multiple access technology, such as an orthogonal frequency division multiplexing (OFDM) system, a filter bank multi-carrier (FBMC) system, a generalized frequency division multiplexing (GFDM) system, and a filtered-OFDM (F-OFDM) system which adopt non-orthogonal multiple access technology.

In the communication system 100 illustrated in FIG. 1, the network device 120 may be an access network device that communicates with the terminal device 110. The access network device can provide a communication coverage for a specific geographical area and communicate with terminal devices 110 (such as user equipment (UE)) in the coverage area.

The network device 120 may be a base transceiver station (BTS) in the GSM or in the CDMA system, or may be a NodeB (NB) in the WCDMA system, or may be an evolutional Node B (eNB or eNodeB) in the LTE system. Alternatively, the network device 120 may be a next generation radio access network (NG RAN), a gNB in an NR system, or a radio controller in a cloud radio access network (CRAN). Alternatively, the network device may be a relay station, an access point, an in-vehicle device, a wearable device, a hub, a switch, a bridge, a router, or a network device in a future evolved public land mobile network (PLMN).

The terminal device 110 can be any terminal device and can include, but is not limited to, a device configured to communicate via a wired line, another data connection/network, a wireless interface, a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of a mobile terminal may include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or a conventional laptop, a handheld receiver, or other electronic devices equipped with radio telephone transceiver. The terminal device may refer to an access terminal, a UE, a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in the future evolved PLMN, etc.

As an example, terminal devices 110 can communicate with each other through device to device (D2D) communication.

As an example, the 5G system or 5G network can also be referred to as a new radio (NR) system or NR network.

FIG. 1 exemplarily illustrates one network device and one terminal device. The communication system 100 may also include multiple network devices, and there can be other numbers of terminal devices in a coverage area of each of the network devices, which is not limited herein.

The communication system 100 may further include other network entities such as a network controller, a mobile management entity, or the like, and the disclosure is not limited in this regard.

According to implementations, a device with communication functions in a network/system can be referred to as a "communication device". Taking the communication system 100 illustrated in FIG. 1 as an example, the communication device may include the network device 120 and the terminal device 110 that have communication functions. The network device 120 and the terminal device 110 can be the devices described above and will not be repeated herein. The communication device may further include other devices such as a network controller, a mobile management entity, or other network entities in the communication system 100, and the disclosure is not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

In the communication framework illustrated in FIG. 1, a packet-based data stream can be transmitted between the terminal device 110 and the network device 120. However, the packet-based data stream is usually bursty.

In other words, the terminal device 110 has data to be transmitted in a time period but has no data to be transmitted in a subsequent long time period. In this case, if the terminal device 110 continues performing physical downlink control channel (PDCCH) blind detection, it will result in high power consumption of the terminal device.

In LTE, the concept of discontinuous reception (DRX) is proposed.

The network device can configure the terminal device to wake up (that is, DRX ON or DRX ON state) at a time predicted by the network, and the terminal device monitors a downlink control channel. The network device can also configure the terminal device to sleep (that is, DRX OFF or DRX OFF state) at a time predicted by the network device, in other words, the terminal device does not have to monitor a downlink control channel. Therefore, if the network device 120 has data to be transmitted to the terminal device 110, the network device 120 can schedule the terminal device 110 when the terminal device 110 is in DRX ON. When the terminal device is in DRX OFF, since radio frequency is disabled, power consumption of the terminal can be reduced.

For example, a DRX function can be configured for a media access control (MAC) entity through radio resource control (RRC) signaling, to control PDCCH monitoring of the terminal device.

Figure 2:
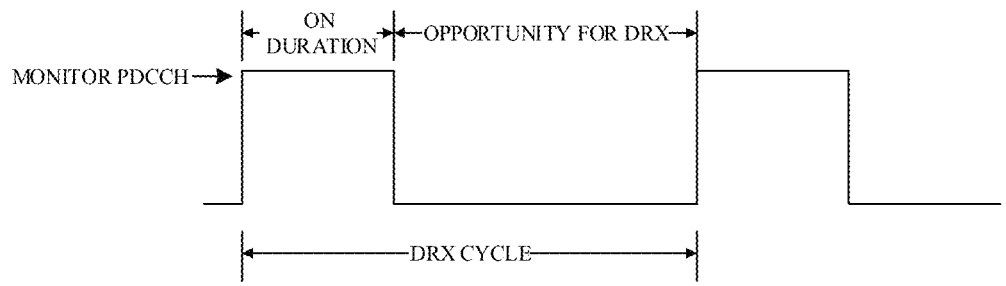
FIG. 2 is a schematic diagram of discontinuous reception (DRX) according to implementations.

As illustrated in FIG. 2, a DRX cycle configured for the terminal device by the network device includes active time (on duration) and sleep time (opportunity for DRX). In an RRC CONNECTED mode, if the terminal device is configured with a DRX function, a MAC entity can control the terminal device to monitor and receive a PDCCH during the on duration, and control the terminal device not to monitor a PDCCH during the opportunity for DRX to save energy.

It should be understood that, during the opportunity for DRX, the terminal device does not receive any PDCCH, but can receive data from other physical channels, and the disclosure is not limited in this regard.

For example, the terminal device can receive a physical downlink shared channel (PDSCH), acknowledgement/negative acknowledgement (ACK/NACK), etc. For another example, during semi-persistent scheduling (SPS), the terminal device can receive PDSCH data that is periodically configured.

The length of the on duration can be controlled by a drx-onDurationTimer and a drx-InactivityTimer.

The drx-onDurationTimer may also be referred to as a DRX active-time timer or a DRX activity timer. The drx-InactivityTimer is also referred to as a DRX inactivity timer or a DRX deactivation timer. When the drx-onDuration-Timer expires, the on duration ends, and the terminal device can prolong the on duration by starting the drx-Inactivity-Timer.

By introducing a wake-up signal (WUS), the network device can transmit the WUS to the terminal device before the drx-onDurationTimer is started, to notify the terminal device of whether to start the drx-onDurationTimer to monitor a PDCCH, thereby reducing power consumption of the terminal device.

For example, if the network device predicts that a particular terminal device will not be scheduled in some future time, the network device can notify this terminal device not to start the drx-onDurationTimer, thereby reducing unnecessary PDCCH monitoring of the terminal device.

However, WUS monitoring of terminal device not only increases power consumption of the terminal device, but also increases PDCCH resource overhead of the terminal device.

Implementations provide a wireless communication method, which is possible to reduce power consumption and PDCCH resource overhead of the terminal device. Specifically, implementations provide a method for wake-up signal (WUS) monitoring, a method for information transmission, and devices, which can reduce power consumption and physical PDCCH resource overhead of a terminal device.

Figure 3:
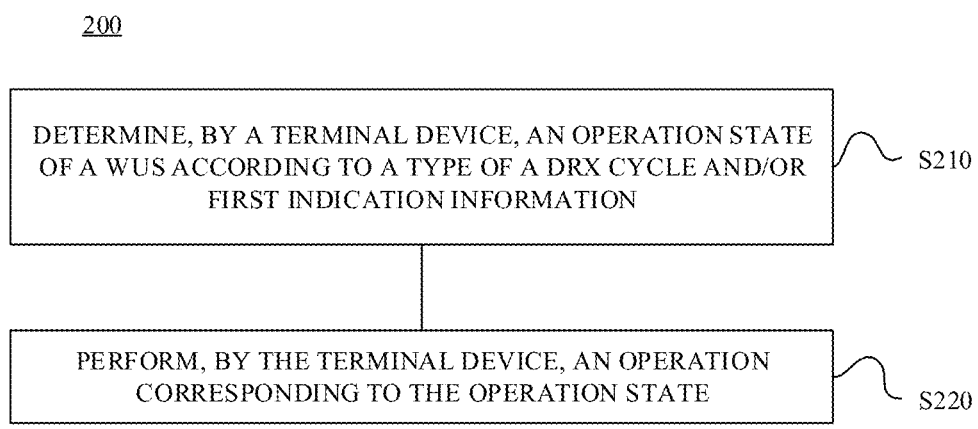
FIG. 3 is a schematic flowchart of a wireless communication method according to implementations.

FIG. 3 is a schematic flowchart of a wireless communication method 200 according to implementations. The method 200 may be implemented by a terminal device. The terminal device illustrated in FIG. 3 may be the terminal device illustrated in FIG. 1.

As illustrated in FIG. 3, the method 200 includes some or all of the following operations.

S210, a terminal device determines an operation state of a WUS according to a type of a DRX cycle and/or first indication information.

S220, the terminal device performs an operation corresponding to the operation state.

It should be understood that, in implementations, the operation state may be a state indicative of whether the terminal device monitors the WUS. For example, if the operation state is a first operation state, the operation state indicates that the terminal device monitors the WUS; and if the operation state is a second operation state, the operation state indicates that the terminal device does not monitor the WUS.

In other words, the first operation state is a monitoring state, and the second operation state is a non-monitoring state.

Therefore, the terminal device determines, according to the type of the DRX cycle and/or the first indication information, whether to monitor the WUS.

The type of the DRX cycle includes a first DRX cycle and a second DRX cycle, where the first DRX cycle is longer than the second DRX cycle. The first indication information is used for indicating whether the terminal device activates or deactivates a WUS function. For example, the first DRX cycle is also referred to as a long DRX cycle, and the second DRX cycle is also referred to as a short DRX cycle. The WUS function refers to a function of WUS monitoring by the terminal device. Activating the WUS function means that the terminal device goes into a WUS-monitoring state, and deactivating WUS function means that the terminal device goes into a non-WUS-monitoring state.

As such, by adopting different WUS monitoring strategies for the first DRX cycle and the second DRX cycle, it is possible to avoid unnecessary WUS monitoring of the terminal device, thereby reducing power consumption and PDCCH resource overhead of the terminal device.

It should be understood that, in implementations, the terminal device can determine whether to monitor a WUS in any DRX cycle, according to the type of the DRX cycle and/or the first indication information, and the disclosure is not limited in this regard. For example, the terminal device may determine in a present DRX cycle whether to monitor a WUS corresponding to a next DRX cycle. For another example, the terminal device may determine in the present DRX cycle whether to monitor a WUS corresponding to a DRX cycle that is at least one DRX cycle later than the present DRX cycle.

In some implementations, the method 200 further includes the following. The terminal device receives configuration information from the network device. The configuration information includes DRX configuration information and/or WUS configuration information.

In some implementations, the DRX configuration information includes at least one of: the first DRX cycle, the second DRX cycle, a DRX cycle timer corresponding to the second DRX cycle (that is, drx-ShortCycleTimer), a drx-onDurationTimer, or a drx-InactivityTimer. The WUS configuration information includes at least one of: a WUS occasion corresponding to the first DRX cycle, a WUS occasion corresponding to the second DRX cycle, or an offset of a WUS occasion.

The following will elaborate the timers used herein.

drx-onDurationTimer: wake-up time of the terminal device at the beginning of a DRX cycle.

drx-ShortCycleTimer (optional): time while the terminal device is in the second DRX cycle (and no PDCCH is received by the terminal device).

drx-InactivityTimer: time of continuous PDCCH monitoring by the terminal device after receiving a PDCCH indicating uplink (UL) initial transmission or downlink (DL) initial transmission.

The configuration information may further include at least one of the following.

drx-SlotOffset: a delay before the terminal device starts the drx-onDurationTimer.

drx-RetransmissionTimerDL (per DL hybrid automatic repeat request (HARQ) process except for a broadcast HARQ process): a maximum duration for monitoring a PDCCH indicating DL retransmission scheduling.

drx-RetransmissionTimerUL (per UL HARQ process): a maximum duration for monitoring a PDCCH indicating UL retransmission scheduling.

drx-LongCycleStartOffset (start offset of the first DRX cycle): used for configuring the first DRX cycle, and a subframe where the first DRX cycle starts as well as a subframe where the second DRX cycle starts.

drx-HARQ-RTT-TimerDL (DRX DL HARQ round trip time (RTT) timer) (per DL HARQ process except for a broadcast HARQ process): a minimum duration before a PDCCH indicating DL scheduling is expected to be received by the terminal device.

drx-HARQ-RTT-TimerUL (per UL HARQ process): a minimum duration before a PDCCH indicating UL scheduling is expected to be received by the terminal device.

If the terminal device is configured with DRX, the terminal device needs to monitor the PDCCH in DRX active time. The DRX active time includes a time while any one of the drx-onDurationTimer, the drx-InactivityTimer, the drx-RetransmissionTimerDL, the drx-RetransmissionTimerUL, or a ra-ContentionResolutionTimer is running.

The terminal device can determine, according to whether a present DRX cycle is the second DRX cycle or the first DRX cycle, a time for starting the drx-onDurationTimer.

For example, if the second DRX cycle is used, and [(SFNx 10)+subframe number] modulo (drx-ShortCycle)= (drx-StartOffset) modulo (drx-ShortCycle), where SFN represents system frame number.

For another example, if the first DRX cycle is used, and [(SFNx 10)+subframe number] modulo (drx-LongCycle) =drx-StartOffset.

"modulo" represents a modulo operation.

In the above two cases, the terminal device can start the drx-onDurationTimer at a time that is drx-SlotOffset slots subsequent to a present subframe.

A condition for starting or restarting the drx-InactivityTimer includes, but is not limited to the following.

The terminal device starts or restarts the drx-InactivityTimer if the terminal device receives a PDCCH indicating DL initial transmission or UL initial transmission.

A condition for starting or stopping the drx-RetransmissionTimerDL includes, but is not limited to the following.

The terminal device stops a drx-RetransmissionTimerDL corresponding to a HARQ process, if the terminal device receives a PDCCH indicating DL transmission, or receives a MAC protocol data unit (PDU) on a configured DL grant resource. The terminal device can start a drx-HARQ-RTT-TimerDL corresponding to the HARQ process after completing transmission of a HARQ feedback for present DL transmission.

The terminal device starts a drx-RetransmissionTimerDL corresponding to a HARQ process, if a drx-HARQ-RTT-TimerDL corresponding to the HARQ process of the terminal device expires and decoding of DL data transmitted by using the HARQ process fails.

A condition for starting or stopping the drx-RetransmissionTimerUL includes, but is not limited to the following.

The terminal device stops a drx-RetransmissionTimerUL corresponding to a HARQ process, if the terminal device receives a PDCCH indicating UL transmission, or transmits a MAC PDU on a configured UL grant resource. The terminal device starts a drx-HARQ-RTT-TimerUL corresponding to the HARQ process after a first repetition of a physical uplink shared channel (PUSCH).

The terminal device starts a drx-RetransmissionTimerUL corresponding to a HARQ process, if a drx-HARQ-RTT-TimerUL corresponding to the HARQ process of the terminal device expires.

In some implementations, the terminal device may use the second DRX cycle, if the drx-InactivityTimer expires and/or the terminal device receives a DRX command media access control control element (DRX command MAC CE).

In some implementations, the terminal device may use the second DRX cycle, if the drx-ShortCycleTimer expires and/or the terminal device receives a long DRX command MAC CE.

In some implementations, the terminal device can determine whether to monitor the WUS according to the type of the DRX cycle.

Optionally, if the DRX cycle of the terminal device is the first DRX cycle, the terminal device monitors the WUS.

Here, the terminal device may start or not start the drx-onDurationTimer at a time corresponding to the first DRX cycle (that is, start time for the first DRX cycle) according to the WUS.

For example, if a WUS is detected by the terminal device and the WUS is used for indicating that the terminal device wakes up DRX active time (that is, starts drx-onDurationTimer), the terminal device starts the drx-onDurationTimer at the time corresponding to the first DRX cycle. Alternatively or additionally, if a WUS is detected by the terminal device and the WUS is used for indicating that the terminal device does not wake up the DRX active time (that is, does not start drx-onDurationTimer), the terminal device does not start the drx-onDurationTimer at the time corresponding to the first DRX cycle. Alternatively or additionally, if no WUS is detected by the terminal device, the terminal device does not start the drx-onDurationTimer at the time corresponding to the first DRX cycle.

In other words, if the DRX cycle of the terminal device is the first DRX cycle, the terminal device determines the operation state as a first operation state, where the first operation state is used for indicating monitoring the WUS.

Here, the terminal device determines a work state of the drx-onDurationTimer at a start time for the drx-onDurationTimer of the first DRX cycle according to the WUS, and performs an operation corresponding to the work state.

It should be understood that, the work state can be indicative of whether to start the drx-onDurationTimer. For example, the work state of the drx-onDurationTimer may include a started state, and the started state represents starting the drx-onDurationTimer at the start time. The work state may also include a non-started state, and the non-started state represents the drx-onDurationTimer is not started at the start time. The work state may further include a running state, a stopped state, a paused state, a turned-off state, etc., which is not limited herein.

For example, if a first WUS used for indicating that the terminal device wakes up the DRX active time is detected by the terminal device, the terminal device determines the work state as starting the drx-onDurationTimer at the start time for the first DRX cycle. Additionally and/or alternatively, if a second WUS used for indicating that the terminal device stays in DRX sleep time (that is, opportunity for DRX) is detected by the terminal device, the terminal device determines the work state as not starting the drx-onDuration-Timer at the start time for the first DRX cycle. Additionally and/or alternatively, if no WUS is detected by the terminal device, the terminal device determines the work state as not starting the drx-onDurationTimer at the start time for the first DRX cycle.

Alternatively, if the DRX cycle of the terminal device is the second DRX cycle, the terminal device does not monitor the WUS. In this situation, the terminal device may start the drx-onDurationTimer at a time corresponding to the second DRX cycle.

In other words, if the DRX cycle of the terminal device is the second DRX cycle, the terminal device determines the operation state as the second operation state, where the second operation state is used for indicating not monitoring the WUS. In this situation, the terminal device starts the drx-onDurationTimer at the time corresponding to the second DRX cycle.

In other words, the terminal device can directly start the drx-onDurationTimer at the time corresponding to each second DRX cycle.

In short, if the terminal device is in the first DRX cycle, the terminal device determines whether to start the drx-onDurationTimer through WUS monitoring. If the terminal device is in the second DRX cycle, the terminal device can directly start the drx-onDurationTimer as usual without WUS monitoring.

Whether the terminal device is in the first DRX cycle or in the second DRX cycle can generally reflect present service activity of the terminal device and scheduling frequency of the terminal device by the network device. For example, if the terminal device is in the first DRX cycle, it indicates that the service of the terminal device is relatively sparse at present, or the terminal device is scheduled by the network device at a low frequency. In other words, if a WUS is used in this scenario, it is possible to reduce unnecessary PDCCH monitoring of the terminal device, thereby reducing power consumption the terminal device. For another example, if the terminal device is in the second DRX cycle, it indicates that the service of the terminal device is relatively intensive at present, and the terminal device is scheduled by the network device at a high frequency. In other words, use of WUS in this scenario does not necessarily reduce unnecessary PDCCH monitoring of the terminal device, and on the other hand, may increase PDCCH resource overhead.

According to these implementations, when the terminal device is in the second DRX cycle, whether to start the drx-onDurationTimer can be determined without WUS monitoring. As such, in addition to reducing power consumption of the terminal device in the first DRX cycle, it is possible to reduce PDCCH resource overhead of the terminal device in the second DRX cycle.

Figure 4:
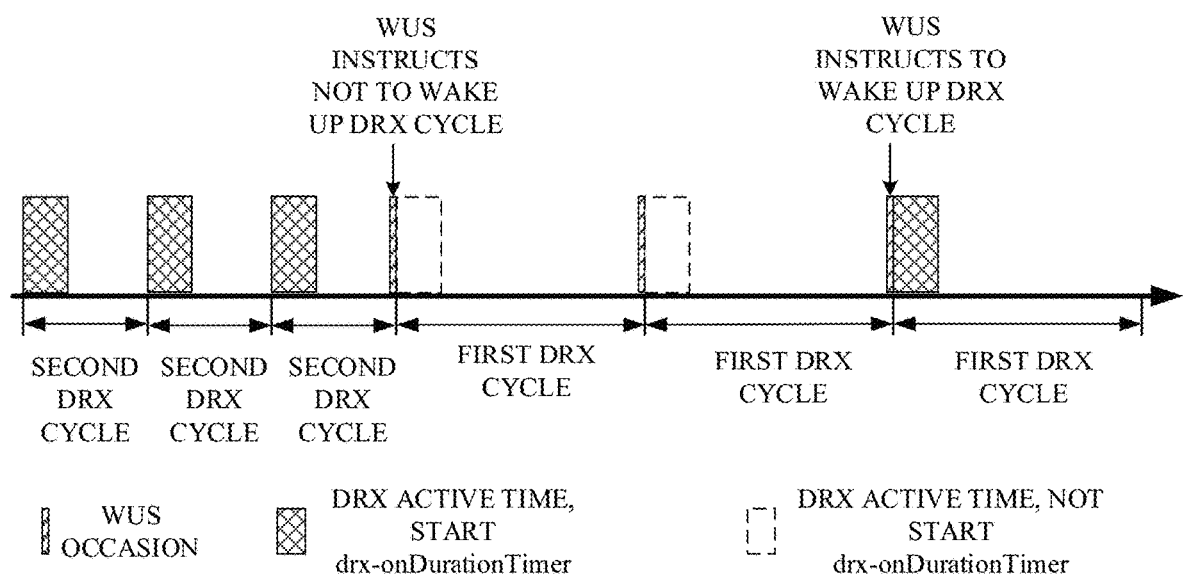
FIG. 4 to FIG. 6 are exemplary diagrams illustrating the method illustrated in FIG. 3.

FIG. 4 is an exemplary diagram illustrating the wireless communication method.

As illustrated in FIG. 4, the terminal device receives RRC configuration information from the network device, where the RRC configuration information includes DRX parameter configuration and WUS parameter configuration.

The first 3 DRX cycles of the terminal device are second DRX cycles. In each second DRX cycle, the terminal device starts the drx-onDurationTimer, and does not monitor a WUS.

The terminal device enters the first DRX cycle from the $4^{th}$ DRX cycle. The terminal device performs WUS monitoring at a WUS time before each first DRX cycle. The WUS time is also referred to as WUS occasion. For example, if a WUS is detected by the terminal device on a WUS occasion before the $4^{th}$ DRX cycle, and the WUS is used for indicating that the terminal device does not wake up, the terminal device does not start the drx-onDurationTimer in the $4^{th}$ DRX cycle. If no WUS is detected by the terminal device on a WUS occasion before a $5^{th}$ DRX cycle, the terminal device does not start the drx-onDurationTimer in the $5^{th}$ DRX cycle.

If a WUS is detected by the terminal device on a WUS occasion before a $6^{th}$ DRX cycle, and the WUS is used for indicating that the terminal device wakes up, the terminal device starts the drx-onDurationTimer in the $6^{th}$ DRX cycle.

In some implementations, if the DRX cycle of the terminal device is the second DRX cycle, the terminal device determines whether to monitor the WUS.

In other words, if the DRX cycle of the terminal device is the second DRX cycle, and the terminal device determines the operation state as the first operation state or the second operation state, where the first operation state is used for indicating monitoring the WUS, and the second operation state is used for indicating not monitoring the WUS.

That is, the terminal device may monitor or not monitor the WUS on a WUS occasion corresponding to each second DRX cycle.

For example, if the DRX cycle of the terminal device is the second DRX cycle, the terminal device monitors the WUS if a first condition is satisfied. For another example, if the DRX cycle of the terminal device is the second DRX cycle, the terminal device does not monitor the WUS if a second condition is satisfied.

In some implementations, if the drx-InactivityTimer expires, the terminal device is triggered to switch to the second DRX cycle from the first DRX cycle, and the terminal device monitors the WUS.

As such, the terminal device may start or not start the drx-onDurationTimer at the time corresponding to the second DRX cycle according to the WUS.

For example, if a WUS is detected by the terminal device and the WUS is used for indicating that the terminal device wakes up the DRX active time, the terminal device starts the drx-onDurationTimer at the time corresponding to the second DRX cycle. Alternatively and/or additionally, if a WUS is detected by the terminal device and the WUS is used for indicating that the terminal device does not wake up the DRX active time, the terminal device does not start the drx-onDurationTimer at the time corresponding to the second DRX cycle. Alternatively and/or additionally, if no WUS is detected by the terminal device, the terminal device does not start the drx-onDurationTimer at the time corresponding to the second DRX cycle.

In other words, if the drx-InactivityTimer expires, the terminal device switches the DRX cycle of the terminal device to the second DRX cycle from the first DRX cycle, and determines the operation state as the first operation state.

As such, the terminal device determines the work state of the drx-onDurationTimer at the start time for the second DRX cycle according to the WUS, and performs an operation corresponding to the work state.

For example, if a third WUS used for indicating that the terminal device wakes up the DRX active time is detected by the terminal device, the terminal device determines the work state as starting the drx-onDurationTimer at a start time for the second DRX cycle. Alternatively and/or additionally, if a fourth WUS used for indicating that the terminal device stays in the DRX sleep time is detected by the terminal device, the terminal device determines the work state as not starting the drx-onDurationTimer at the start time for the second DRX cycle. Alternatively and/or additionally, if no WUS is detected by the terminal device, the terminal device determines the work state as not starting the drx-onDurationTimer at the start time for the second DRX cycle.

If the terminal device switches to the second DRX cycle due to expiration of the drx-InactivityTimer, it does not necessarily mean that the network device expects to frequently schedule the terminal device over a period of time. If the network device does not expect to schedule the terminal device, the network device can transmit a WUS to the terminal device, to instruct the terminal device not to wake up the DRX active time. In this case, using the WUS helps to obtain power saving gain of the terminal device.

In some implementations, if the terminal device receives second indication information transmitted by the network device, the terminal device does not monitor the WUS. The second indication information is used for indicating that the terminal device switches to the second DRX cycle from the first DRX cycle. The terminal device starts the drx-onDurationTimer at the time corresponding to the second DRX cycle.

In other words, the terminal device receives the second indication information from the network device, where the second indication information is used for indicating that the terminal device switches the DRX cycle to the second DRX cycle from the first DRX cycle. The terminal device determines the operation state as the second operation state.

For example, the second indication information may be a DRX Command MAC CE.

In other words, if the terminal device receives information used for indicating that the terminal device switches to the second DRX cycle from the first DRX cycle, the terminal device does not monitor the WUS, and the terminal device starts by default the drx-onDurationTimer at the time corresponding to the second DRX cycle.

If the terminal device switches to the second DRX cycle because the terminal device receives the second indication information, since the network device explicitly instructs the terminal device to switch to the second DRX cycle, it indicates that the network device knows or predicts that the terminal device has data transmission demand over a period of time, and the network device expects to frequently schedule the terminal device. In this case, using of the WUS does not necessarily help to obtain significant power saving gain of the terminal device, and therefore does not have to perform WUS monitoring, and the terminal device starts the drx-onDurationTimer as usual each time for PDCCH monitoring, which is possible to reduce WUS overhead.

In some implementations, if the terminal device receives third indication information transmitted by the network device, and the third indication information is used for indicating whether the terminal device in the second DRX cycle monitors the WUS or not, the terminal device determines whether to monitor the WUS according to the third indication information.

In other words, if the third indication information transmitted by the network device is received by the terminal device, the terminal device determines the operation state of the WUS, where the third indication information is used for indicating whether the operation state of the terminal device in the second DRX cycle is the first operation state or the second operation state.

For example, an RRC configuration parameter may be added, which is used for controlling the terminal device to monitor or not to monitor the WUS in the second DRX cycle.

In other words, the terminal device may monitor the WUS in the first DRX cycle, and determines whether to monitor the WUS in the second DRX cycle according to the RRC configuration parameter.

Whether the terminal device is in the first DRX cycle or in the second DRX cycle can generally reflect present service activity of the terminal device and scheduling frequency of the terminal device by the network device. For example, if the terminal device is in the first DRX cycle, it indicates that the service of the terminal device is relatively sparse at present, or the terminal device is scheduled by the network device at a low frequency. In other words, if a WUS is used in this scenario, it is possible to reduce unnecessary PDCCH monitoring of the terminal device, thereby reducing power consumption of the terminal device. For another example, if the terminal device is in the second DRX cycle, it indicates that the service of the terminal device is relatively intensive at present, and the terminal device is scheduled by the network device at a high frequency. In other words, use of WUS in this scenario does not necessarily reduce unnecessary PDCCH monitoring of the terminal device, and on the other hand, may increase PDCCH resource overhead.

According to implementations herein, for the terminal device in the second DRX cycle, it is possible to avoid unconditional WUS monitoring, which can not only reduce power consumption of the terminal device in the first DRX cycle, but also reduce PDCCH resource overhead of the terminal device in the second DRX cycle.

Figure 5:
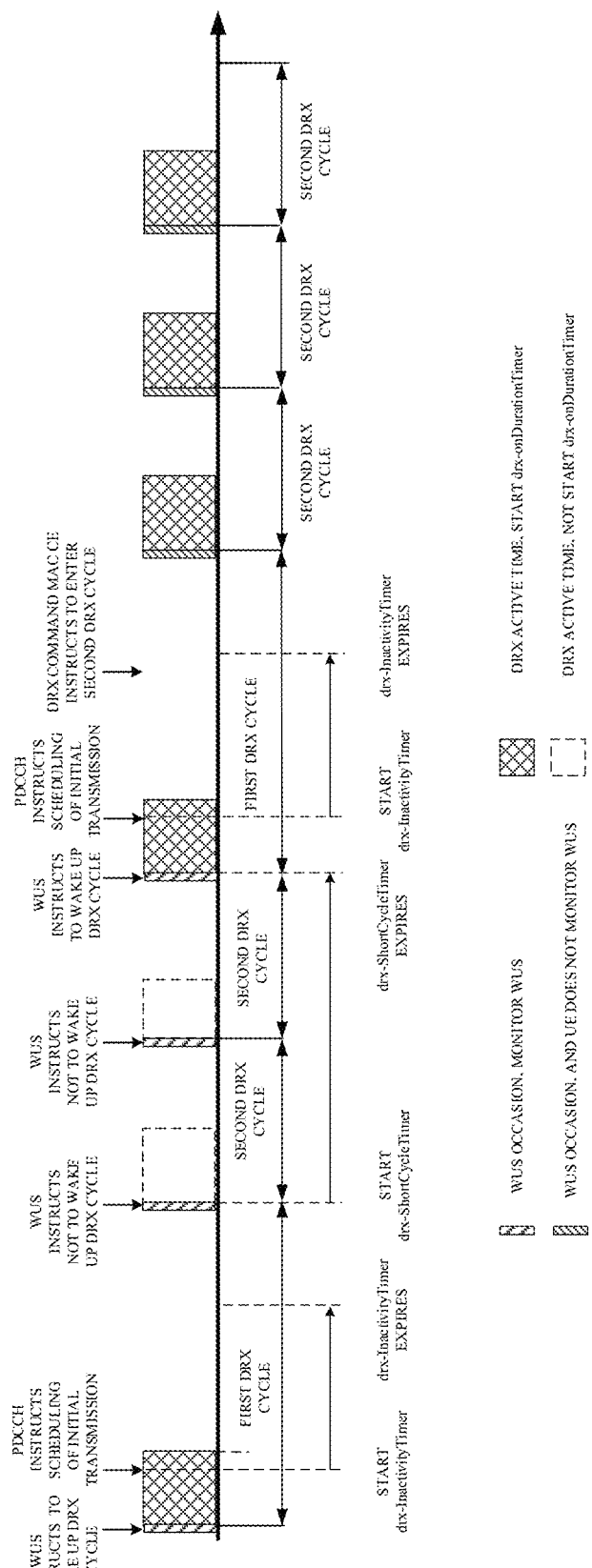

FIG. 5 is an exemplary diagram illustrating the wireless communication method.

As illustrated in FIG. 5, the terminal device receives RRC configuration information from the network device, where the RRC configuration information includes DRX parameter configuration and WUS parameter configuration.

The terminal device monitors the WUS on each WUS occasion for the first DRX cycle. If the terminal device receives, on a WUS occasion before the $1^{st}$ first DRX cycle, a WUS used for indicating that the terminal device wakes up the DRX active time, the terminal device starts the drx-onDurationTimer as usual in the $1^{st}$ first DRX cycle.

If the terminal device receives a PDCCH indicating scheduling of initial transmission during running of the drx-onDurationTimer in the $1^{st}$ first DRX cycle, the terminal device starts the drx-InactivityTimer. If the drx-InactivityTimer expires, the terminal device switches to the second DRX cycle from the first DRX cycle. In this case, the terminal device monitors the WUS on a WUS occasion corresponding to each second DRX cycle, and determines whether to start the drx-onDurationTimer in a subsequent DRX cycle according to the WUS.

The terminal device starts the drx-ShortCycleTimer at the time of starting the drx-onDurationTimer. If the drx-ShortCycleTimer expires, the terminal device switches to the first DRX cycle from the second DRX cycle.

The terminal device monitors the WUS on each WUS occasion for the first DRX cycle, and determines, according to the WUS, whether to start the drx-onDurationTimer in a subsequent DRX cycle.

Upon receiving a DRX Command MAC CE, the terminal device switches to the second DRX cycle to the first DRX cycle.

The terminal device does not monitor the WUS on each WUS occasion for the second DRX cycle. The terminal device starts the drx-onDurationTimer as usual in each second DRX cycle.

The terminal device may determine, according to the first indication information directly, whether to monitor the WUS.

In some implementations, if the first indication information is used for indicating that the terminal device deactivates the WUS function, the terminal device does not monitor the WUS. In this case, the terminal device starts the drx-onDurationTimer at a time corresponding to each DRX cycle.

In other words, if the first indication information is used for indicating that the terminal device deactivates the WUS function, the terminal device determines the operation state as the second operation state, where the second operation state is used for indicating not monitoring the WUS. As such, the terminal device starts the drx-onDurationTimer at the time corresponding to each DRX cycle.

That is, if the first indication information is used for indicating that the terminal device deactivates the WUS function, the terminal device can directly start the drx-onDurationTimer at the time corresponding to each DRX cycle.

In other implementations, if the first indication information is used for indicating that the terminal device activates the WUS function, the terminal device monitors the WUS.

In this case, the terminal device starts or does not start the drx-onDurationTimer at the time corresponding to each DRX cycle according to the WUS.

For example, if a WUS is detected by the terminal device and the WUS is used for indicating that the terminal device wakes up the DRX active time, the terminal device starts the drx-onDurationTimer at the time corresponding to each DRX cycle. Additionally and/or alternatively, if a WUS is detected by the terminal device and the WUS is used for indicating that the terminal device does not wake up the DRX active time, the terminal device does not start the drx-onDurationTimer at the time corresponding to each DRX cycle. Additionally and/or alternatively, if no WUS is detected by the terminal device, the terminal device does not start the drx-onDurationTimer at the time corresponding to each DRX cycle.

In other words, if the first indication information is used for indicating that the terminal device activates the WUS function, the terminal device determines the operation state as the first operation state, where the first operation state is used for indicating monitoring the WUS.

In this case, the terminal device determines the work state of the drx-onDurationTimer at the start time for each DRX cycle according to the WUS, and performs an operation corresponding to the work state.

For example, if a fifth WUS used for indicating that the terminal device wakes up the DRX active time is detected by the terminal device, the terminal device determines the work state as starting the drx-onDurationTimer at a start time for each DRX cycle. Alternatively and/or additionally, if a sixth WUS used for indicating that the terminal device stays in the DRX sleep time is detected by the terminal device, the terminal device determines the work state as not starting the drx-onDurationTimer at the start time for each DRX cycle. Alternatively and/or additionally, if no WUS is detected by the terminal device, the terminal device determines the work state as not starting the drx-onDurationTimer at the start time for each DRX cycle.

If the terminal device is in the first DRX cycle, the terminal device receives from the network device a DRX command MAC CE which is used for indicating that the terminal device switches to the second DRX cycle. In this case, the DRX command MAC CE can be further used for indicating whether the terminal device activates or deactivates the WUS function.

For another example, if the terminal device is in the second DRX cycle, the terminal device receives from the network device a long DRX command MAC CE which is used for indicating that the terminal device switches to the first DRX cycle. In this case, the long DRX command MAC CE can be further used for indicating whether the terminal device activates or deactivates the WUS function.

In short, the terminal device may determine whether to monitor the WUS, according to explicit indication information which is used for indicating whether the terminal device activates the WUS function and carried in signaling that is used for indicating whether the terminal device enters the first DRX cycle or the second DRX cycle. The signaling may be a DRX command MAC CE or a long DRX command MAC CE.

According to this implementation, with change in service amount of the terminal device and change in frequency at which the terminal device is scheduled by the network device, whether to monitor the WUS can be dynamically indicated through the first indication information, which is possible to flexibly control the terminal device to perform or not to perform WUS monitoring.

In some implementations, the method 200 further includes the following. The terminal device receives the first indication information transmitted by the network device.

In some implementations, the terminal device receives fourth indication information transmitted by the network device. The fourth indication information is used for indicating whether the terminal device switches to the second DRX cycle from the first DRX cycle or switches to the first DRX cycle from the second DRX cycle. The fourth indication information includes the first indication information.

In other implementations, the terminal device receives RRC signaling transmitted by the network device, where the RRC signaling includes the first indication information. For example, the network device may instruct the terminal device whether to activate the WUS function, by using a field of 1 bit in an RRC (re)configuration message.

In some implementations, a default state of the WUS function is an active state or an inactive state.

Figure 6:
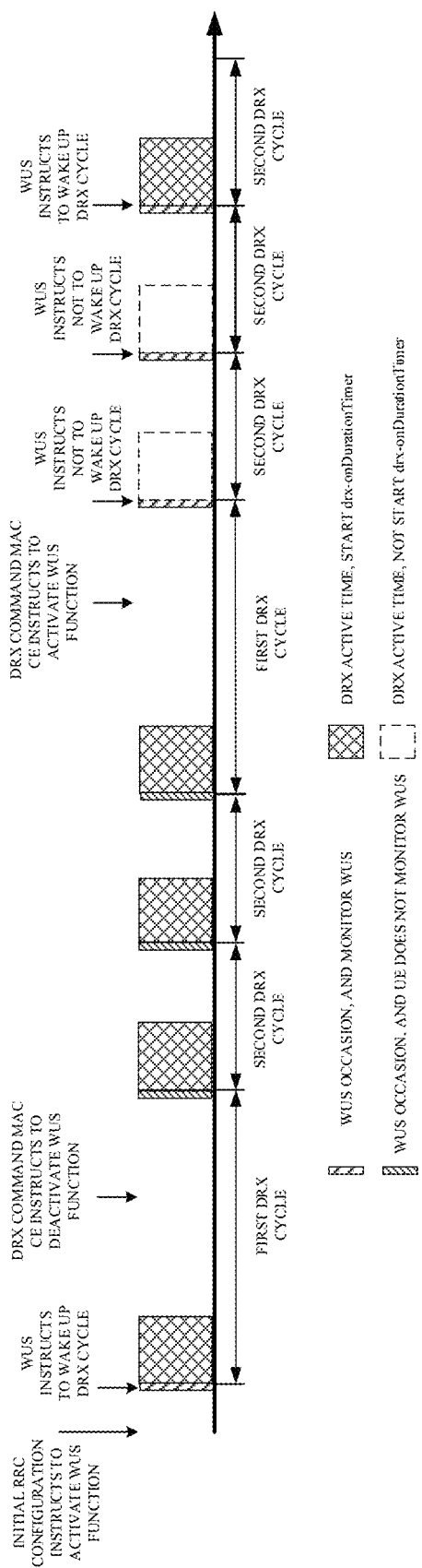

FIG. 6 is an exemplary diagram illustrating the wireless communication method.

As illustrated in FIG. 6, the terminal device receives RRC configuration information from the network device, where the RRC configuration information includes DRX parameter configuration and WUS parameter configuration.

The terminal device activates the WUS function according to a WUS activation indication in RRC signaling received from the network device.

The terminal device performs WUS monitoring on a WUS occasion corresponding to a $1^{st}$ DRX cycle. Once receiving a WUS used for indicating that the terminal device wakes up the DRX active time, the terminal device starts the drx-onDurationTimer in the $1^{st}$ DRX cycle.

Once receiving a DRX command MAC CE used for indicating that the terminal device deactivates the WUS function, the terminal device switches to the second DRX cycle from the first DRX cycle, and the terminal device does not perform WUS monitoring in any of subsequent WUS occasions, and starts the drx-onDurationTimer as usual in each DRX cycle. After 2 second DRX cycles passed, the terminal device switches to the first DRX cycle from the second DRX cycle due to expiration of the drx-ShortCycleTimer. The terminal device does not perform WUS monitoring during the first DRX cycle, and starts the drx-onDurationTimer in each DRX cycle.

Once receiving a DRX command MAC CE used for indicating that the terminal device activates the WUS function, the terminal device switches to the second DRX cycle from the first DRX cycle, and performs WUS monitoring in each of subsequent WUS occasions. The terminal device determines, according to a WUS received, whether to start the drx-onDurationTimer in a subsequent DRX cycle.

The method provided in implementations has been described in detail from the perspective of the terminal device. The following will describe a method of implementations from the perspective of the network device.

In some implementations, a network device transmits first indication information to a terminal device, where the first indication information is used for indicating whether the terminal device activates or deactivates a WUS function.

In some implementations, the network device transmits fourth indication information to the terminal device. The fourth indication information is used for indicating whether the terminal device switches to a second DRX cycle from a first DRX cycle or switches to the first DRX cycle from the second DRX cycle. The fourth indication information includes the first indication information.

In other implementations, the network device transmits RRC signaling to the terminal device, where the RRC signaling includes the first indication information.

In some implementations, a default state of the WUS function is an active state or an inactive state.

In some implementations, the network device transmits configuration information to the terminal device, where the configuration information includes DRX configuration information and WUS configuration information.

In some implementations, the DRX configuration information includes at least one of: the first DRX cycle, the second DRX cycle, a DRX cycle timer corresponding to the second DRX cycle, a drx-onDurationTimer, or a drx-InactivityTimer. The WUS configuration information includes at least one of: a WUS occasion corresponding to the first DRX cycle, a WUS occasion corresponding to the second DRX cycle, or an offset of a WUS occasion.

It should be understood that, for details of the method on the network device side, reference can be made to corresponding operations in the method 200 on the terminal device side, which will not be repeated herein for the sake of simplicity.

Exemplary implementations have been described in detail above with reference to the accompanying drawings, but the disclosure is not limited to details in the foregoing implementations. Within the technical conception scope of the disclosure, various simple modifications may be made to the technical solutions of implementations, and these simple modifications shall all belong to the protection scope of the disclosure.

For example, various technical features described in the foregoing implementations may be combined with each other in any suitable manner without contradiction. In order to avoid unnecessary repetition, various possible combinations will not be elaborated herein.

For another example, various implementations may be combined with each other arbitrarily, and as long as they do not violate the idea of the disclosure, they should also be regarded as the contents disclosed in the disclosure.

It should be understood that, in various method implementations of the disclosure, the size of the sequence number of each process described above does not mean the order of execution, and the execution order of each process should be determined by its function and internal logic, which shall not constitute any limitation on the implementation process of implementations.

Method implementations of the disclosure have been described in detail above with reference to FIG. 2 to FIG. 6. The following will describe in detail apparatus implementations with reference to FIG. 7 to FIG. 10.

Figure 7:
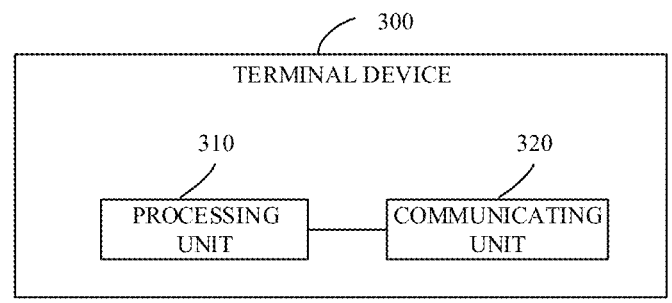
FIG. 7 is a schematic block diagram of a terminal device according to implementations.

FIG. 7 is a schematic block diagram of a terminal device 300 according to implementations.

As illustrated in FIG. 7, the terminal device 300 includes a processing unit 310. The processing unit 310 is configured to operate as follows. The processing unit 310 is configured to determine an operation state of a WUS according to a type of a DRX cycle and/or first indication information. The processing unit 310 is configured to perform an operation corresponding to the operation state. The type of the DRX cycle includes a first DRX cycle and a second DRX cycle, where the first DRX cycle is longer than the second DRX cycle. The first indication information is used for indicating whether terminal device activates or deactivates a WUS function.

In some implementations, and the processing unit 310 is configured to determine the operation state as a first operation state when the DRX cycle of the terminal device is the first DRX cycle, where the first operation state is used for indicating monitoring the WUS.

In some implementations, the processing unit 310 is further configured to operate as follows. The processing unit 310 is further configured to determine a work state of a drx-onDurationTimer at a start time for the drx-onDurationTimer of the first DRX cycle according to the WUS. The processing unit 310 is further configured to perform an operation corresponding to the work state.

In some implementations, the processing unit 310 is configured to perform one of the following. The processing unit 310 is configured to determine the work state as starting the drx-onDurationTimer at the start time for the first DRX cycle, if a first WUS used for indicating that the terminal device wakes up DRX active time is detected by the terminal device. The processing unit 310 is configured to determine the work state as not starting the drx-onDurationTimer at the start time for the first DRX cycle, if a second WUS used for indicating that the terminal device stays in DRX sleep time is detected by the terminal device. The processing unit 310 is configured to determine the work state as not starting the drx-onDurationTimer at the start time for the first DRX cycle, if no WUS is detected by the terminal device.

In some implementations, the processing unit 310 is configured to determine the operation state as a second operation state when the DRX cycle of the terminal device is the second DRX cycle, where the second operation state is used for indicating not monitoring the WUS.

In some implementations, the processing unit 310 is further configured to start the drx-onDurationTimer at a start time for the second DRX cycle.

In some implementations, the processing unit 310 is configured to determine the operation state as the first operation state or the second operation state when the DRX cycle of the terminal device is the second DRX cycle, where the first operation state is used for indicating monitoring the WUS, and the second operation state is used for indicating not monitoring the WUS.

In some implementations, the processing unit 310 is configured to operate as follows. The processing unit 310 is configured to switch the DRX cycle of the terminal device to the second DRX cycle from the first DRX cycle, if a drx-InactivityTimer expires, if a drx-InactivityTimer expires. The processing unit 310 is configured to determine the operation state as the first operation state.

In some implementations, the processing unit 310 is further configured to operate as follows. The processing unit 310 is further configured to determine the work state of the drx-onDurationTimer at the start time for the second DRX cycle according to the WUS. The processing unit 310 is further configured to perform an operation corresponding to the work state.

In some implementations, the processing unit 310 is configured to perform one of the following. The processing unit 310 is configured to determine the work state as starting the drx-onDurationTimer at the start time for the second DRX cycle, if a third WUS used for indicating that the terminal device wakes up the DRX active time is detected by the terminal device. The processing unit 310 is configured to determine the work state as not starting the drx-onDurationTimer at the start time for the second DRX cycle, if a fourth WUS used for indicating that the terminal device stays in the DRX sleep time is detected by the terminal device. The processing unit 310 is configured to determine the work state as not starting the drx-onDurationTimer at the start time for the second DRX cycle, if no WUS is detected by the terminal device.

In some implementations, the processing unit 310 is configured to operate as follows. The processing unit 310 is configured to receive second indication information from a network device, where the second indication information is used for indicating that the terminal device switches the DRX cycle of the terminal device to the second DRX cycle from the first DRX cycle. The processing unit 310 is configured to determine the operation state as the second operation state.

In some implementations, the processing unit 310 is further configured to start the drx-onDurationTimer at the start time for the second DRX cycle.

In some implementations, the processing unit 310 is configured to determine the operation state of the WUS according to third indication information if the terminal device receives the third indication information transmitted by the network device, where the third indication information is used for indicating whether the operation state of the terminal device in the second DRX cycle is the first operation state or the second operation state.

In some implementations, the processing unit 310 is configured to determine the operation state as the second operation state if the first indication information is used for indicating that the terminal device deactivates the WUS function, where the second operation state is used for indicating not monitoring the WUS.

In some implementations, the processing unit 310 is further configured to start the drx-onDurationTimer at a start time for each DRX cycle.

In other implementations, the processing unit 310 is configured to determine the operation state as the first operation state if the first indication information is used for indicating whether the terminal device activates the WUS function, where the first operation state is used for indicating monitoring the WUS.

In some implementations, the processing unit 310 is further configured to operate as follows. The processing unit 310 is further configured to determine the work state of the drx-onDurationTimer at the start time for each DRX cycle according to the WUS. The processing unit 310 is further configured to perform an operation corresponding to the work state.

In some implementations, the processing unit 310 is configured to perform one of the following. The processing unit 310 is configured to determine the work state as starting the drx-onDurationTimer at the start time for each DRX cycle, if a fifth WUS used for indicating that the terminal device wakes up DRX active time is detected by the terminal device. The processing unit 310 is configured to determine the work state as not starting the drx-onDurationTimer at the start time for each DRX cycle, if a sixth WUS used for indicating that the terminal device stays in DRX sleep time is detected by the terminal device. The processing unit 310 is configured to determine the work state as not starting the drx-onDurationTimer at the start time for each DRX cycle, if no WUS is detected by the terminal device.

In some implementations, the terminal device further includes a communicating unit 320. The communicating unit 320 is configured to receive the first indication information transmitted by the network device.

In some implementations, the communicating unit 320 is configured to receive fourth indication information transmitted by the network device. The fourth indication information is used for indicating whether the terminal device switches to the second DRX cycle from the first DRX cycle or switches to the first DRX cycle from the second DRX cycle. The fourth indication information includes the first indication information.

In other implementations, the communicating unit 320 is configured to receive RRC signaling transmitted by the network device, where the RRC signaling includes the first indication information.

In some implementations, a default state of the WUS function is an active state or an inactive state.

In some implementations, the communicating unit 320 is further configured to receive configuration information transmitted by the network device, where the configuration information includes at least one of DRX configuration information or WUS configuration information.

In some implementations, the DRX configuration information includes at least one of: the first DRX cycle, the second DRX cycle, a DRX cycle timer corresponding to the second DRX cycle, the drx-onDurationTimer, or the drx-InactivityTimer. The WUS configuration information includes at least one of: a WUS occasion corresponding to the first DRX cycle, a WUS occasion corresponding to the second DRX cycle, or an offset of a WUS occasion.

It should be understood that, apparatus implementations and method implementations may correspond to each other. For details not described in apparatus implementations, reference can be made to method implementations. The terminal device 300 illustrated in FIG. 7 may correspond to a body for performing the method 200 of implementations, and the foregoing and other operations and/or functions of various units in the terminal device 300 are used for implementing corresponding operations in the method illustrated in FIG. 3, which will not be repeated herein for the sake of simplicity.

Figure 8:
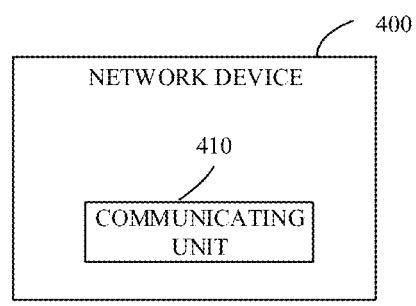
FIG. 8 is a schematic block diagram of a network device according to implementations.

FIG. 8 is a schematic block diagram of a network device 400 according to implementations. As illustrated in FIG. 8, the network device 400 includes a communicating unit 410. The communicating unit 410 is configured to transmit first indication information to a terminal device, where the first indication information is used for indicating whether the terminal device activates or deactivates a WUS function.

In some implementations, the communicating unit 410 is configured to transmit fourth indication information to the terminal device, where the fourth indication information is used for indicating whether the terminal device switches to a second DRX cycle from a first DRX cycle or switches to the first DRX cycle from the second DRX cycle. The fourth indication information includes the first indication information.

In other implementations, the communicating unit 410 is configured to transmit RRC signaling to the terminal device, where the RRC signaling includes the first indication information.

In some implementations, a default state of the WUS function is an active state or an inactive state.

In some implementations, the communicating unit 410 is further configured to transmit configuration information to the terminal device, where the configuration information includes at least one of DRX configuration information or WUS configuration information.

In some implementations, the DRX configuration information includes at least one of: the first DRX cycle, the second DRX cycle, a DRX cycle timer corresponding to the second DRX cycle, a drx-onDurationTimer, or a drx-InactivityTimer. The WUS configuration information includes at least one of: a WUS occasion corresponding to the first DRX cycle, a WUS occasion corresponding to the second DRX cycle, or an offset of a WUS occasion.

It should be understood that, apparatus implementations and method implementations may correspond to each other. For details not described in apparatus implementations, reference can be made to method implementations. The network device 400 illustrated in FIG. 8 may correspond to a body for performing the method 200 of implementations, and the foregoing and other operations and/or functions of various units in the network device 400 are used for implementing corresponding operations in the method illustrated in FIG. 3, which will not be repeated herein for the sake of simplicity.

A communication device (that is, terminal device or network device) of implementations has been described above from the perspective of functional module. It should be understood that, the functional module may be implemented by hardware, or by an instruction in the form of software, or by a combination of hardware and software modules.

Each step of the foregoing method may be completed by an integrated logic circuit of hardware in a processor and/or an instruction in the form of software. The steps of the method disclosed in implementations may be directly implemented as a hardware decoding processor, or may be performed by hardware and software modules in the decoding processor.

The software module can be located in a storage medium such as a random access memory (RAM), a flash memory, a read only memory (ROM), a programmable ROM (PROM), or an electrically erasable programmable memory, registers, and the like. The storage medium is located in a memory. The processor reads information in the memory, and completes the steps of the method described above with the hardware thereof.

For example, the processing unit and the communicating unit described above may be implemented by the processor and a transceiver respectively.

Figure 9:
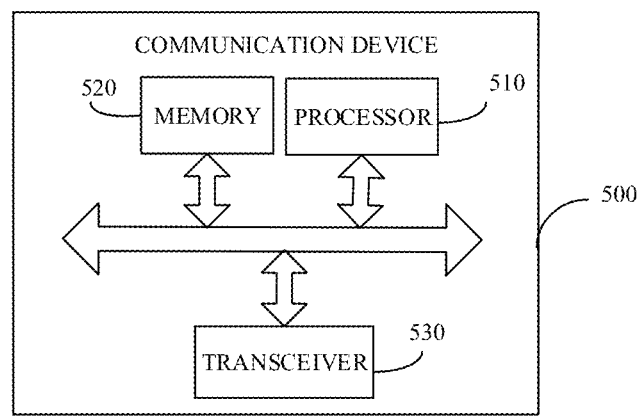
FIG. 9 is a schematic block diagram of a communication device according to implementations.

FIG. 9 is a schematic structural diagram of a communication device 500 according to implementations. As illustrated in FIG. 9, the communication device 500 includes a processor 510. The processor 510 can invoke and execute computer programs stored in a memory to perform the method provided in implementations.

As illustrated in FIG. 9, the communication device 500 can further include the memory 520. The memory 520 can be configured to store indication information, and can be further configured to store codes and instructions executed by the processor 510. The processor 510 can invoke and execute the computer programs stored in the memory 520 to perform the method provided in implementations. The memory 520 may be a separate device independent of the processor 510, or may be integrated into the processor 510.

As illustrated in FIG. 9, the communication device 500 can further include a transceiver 530. The processor 510 can control the transceiver 530 to communicate with other devices, for example, to send information or data to other devices, or to receive information or data from other devices. The transceiver 530 may include a transmitter and a receiver. The transceiver 530 may further include an antenna, where one or more antenna can be provided.

It should be understood that, various components in the communication device 500 are coupled together via a bus system. In addition to a data bus, the bus system further includes a power bus, a control bus, and a status signal bus.

The communication device 500 may be operable as the terminal device of implementations, and the communication device 500 can implement the operations performed by the terminal device described in the foregoing method implementations. In other words, the communication device 500 provided herein may correspond to the terminal device 300 described above, and correspond to a corresponding body (that is, terminal device) in the method 200, which will not be repeated herein for the sake of simplicity. Alternatively, the communication device 500 may be operable as the network device of implementations, and the communication device 500 can implement the operations performed by the network device described in the foregoing method implementations. In other words, the communication device 500 provided herein may correspond to the network device 400 described above, and correspond to a corresponding body (that is, network device) in the method 200, which will not be repeated herein for the sake of simplicity.

Implementations further provide a chip.

For example, the chip may be an integrated circuit chip with signal processing capabilities and can implement or execute the methods, steps, and logic blocks disclosed in implementations. The chip may also be referred to as a system-on-chip (SOC). The chip is applicable to various communication devices, to cause a communication device equipped with the chip to perform the methods, steps, and logic blocks disclosed in implementations.

Figure 10:
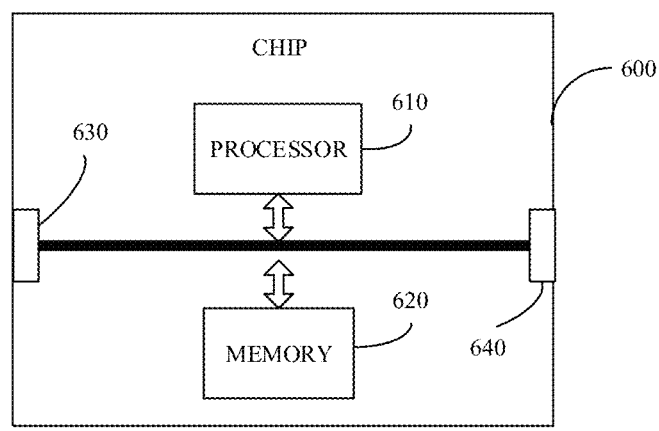
FIG. 10 is a schematic block diagram of a chip according to implementations.

FIG. 10 is a schematic structural diagram of a chip 600 according to implementations. As illustrated in FIG. 10, the chip 600 includes a processor 610. The processor 610 is configured to invoke and execute computer programs stored in a memory to perform the method provided in implementations.

As illustrated in FIG. 10, the chip 600 further includes the memory 620. The processor 610 can invoke and execute the computer programs stored in the memory 620 to perform the method provided in implementations. The memory 620 can be configured to store indication information, and can be further configured to store codes and instructions executed by the processor 610. The memory 620 may be a separate device independent of the processor 610, or may be integrated into the processor 610.

The chip 600 may further include an input interface 630. The processor 610 can control the input interface 630 to communicate with other devices or chips, for example, to acquire information or data sent by other devices or chips.

The chip 600 may further include an output interface 640. The processor 610 can control the output interface 640 to communicate with other devices or chips, for example, to output information or data to other devices or chips.

The chip 600 is applicable to the network device of implementations. The chip can implement the operations performed by the network device described in the foregoing method implementations, or implement the operations performed by the terminal device described in the foregoing method implementations, which will not be repeated herein for the sake of simplicity.

It should be understood that, various components in the chip 600 are coupled together via a bus system. In addition to a data bus, the bus system further includes a power bus, a control bus, and a status signal bus.

The processor may include, but is not limited to, a general-purpose processor, a digital signal processor (DSP), an application specific integrated circuit (ASIC), a field programmable gate array (FPGA), or other programmable logic devices, discrete gates or transistor logic devices, discrete hardware components, etc.

The processor can be configured to implement or execute the methods, steps, and logic blocks disclosed in implementations. The steps of the method disclosed in implementations may be directly implemented as a hardware decoding processor, or may be performed by hardware and software modules in the decoding processor. The software module can be located in a storage medium such as a RAM, a flash memory, a ROM, a PROM, or an erasable programmable memory, registers, and the like. The storage medium is located in the memory. The processor reads information in the memory, and completes the steps of the method described above with the hardware thereof.

The memory according to implementations may include, but is not limited to, a volatile memory and/or a non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM).

The memory described herein is intended to include any suitable type of memory.

Implementations further provide a computer readable storage medium. The computer readable storage medium is configured to store computer programs. The computer readable storage medium is configured to store one or more programs. The one or more programs include instructions which, when executed by a portable electronic device including multiple application programs, are operable with the portable electronic device to perform the method 200 in the foregoing implementations.

The computer readable storage medium is applicable to the network device of implementations. The computer programs, when executed, are operable with a computer to implement the operations performed by the network device described in the foregoing method implementations, which will not be repeated herein for the sake of simplicity.

Alternatively, the computer readable storage medium is applicable to the mobile terminal/the terminal device of implementations. The computer programs, when executed, are operable with a computer to implement the operations performed by the mobile terminal/the terminal device described in the foregoing method implementations, which will not be repeated herein for the sake of simplicity.

Implementations further provide a computer program product. The computer program product includes computer programs.

The computer program product is applicable to the network device of implementations. The computer programs, when executed, are operable with a computer to implement the operations performed by the network device described in the foregoing method implementations, which will not be repeated herein for the sake of simplicity.

Alternatively, the computer program product is applicable to the mobile terminal/the terminal device of implementations. The computer programs, when executed, are operable with a computer to implement the operations performed by the mobile terminal/the terminal device described in the foregoing method implementations, which will not be repeated herein for the sake of simplicity.

Implementations further provide a computer program. The computer program, when executed by a computer, is operable with the computer to perform operations of the method 200 described above.

The computer program is applicable to the network device of implementations. The computer program, when executed by a computer, is operable with the computer to implement the operations performed by the network device described in the foregoing method implementations, which will not be repeated herein for the sake of simplicity.

Implementations further provide a communication system. The communication system may include the terminal device and the network device in the foregoing implementations, to be structured like the communication system 100 illustrated in FIG. 1, which will not be repeated herein for the sake of simplicity. The term "system" herein can also be referred to as "network management architecture" or "network system".

In addition, terms used in implementations herein or in the appended claims are merely intended for describing implementations, rather than limiting the disclosure.

For example, unless otherwise stated, singular forms "a", "the", "above", and "this" used in implementations herein and the appended claims are also intended to include plural forms.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

If the functional units are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations herein may also be implemented in various other manners.

For example, the division of units, modules, or assemblies in the foregoing apparatus implementations is only a division of logical functions, and there may exist other manners of division in practice, e.g., multiple units, modules, or assemblies may be combined or may be integrated into another system, or some units, modules, or assemblies may be ignored or skipped.

For another example, separated units/modules/assemblies as illustrated may or may not be physically separated. Components displayed as units/modules/assemblies may or may not be physical units, and may reside at one location or may be distributed to multiple networked units. Some or all of the units/modules/assemblies may be selectively adopted according to practical needs to achieve desired objectives of the disclosure.

The coupling or direct coupling or communication connection as illustrated or discussed may be an indirect coupling or communication connection through some interface, device or unit, and may be electrical, mechanical, or otherwise.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for wake-up signal (WUS) monitoring, comprising:
   determining, by a terminal device, an operation state of a WUS according to a type of a discontinuous reception (DRX) cycle; and
   performing, by the terminal device, an operation corresponding to the operation state;
   wherein the type of the DRX cycle comprises a first DRX cycle and a second DRX cycle;
   wherein the first DRX cycle is longer than the second DRX cycle, wherein determining the operation state of the WUS comprises:
   determining, by the terminal device, the operation state as a second operation state when the DRX cycle of the terminal device is the second DRX cycle, wherein the second operation state is used for indicating not monitoring the WUS;
   the method further comprises:
   starting, by the terminal device, a drx-onDurationTimer at a start time for the second DRX cycle.

2. The method of claim 1, wherein determining the operation state of the WUS comprises:
   determining, by the terminal device, the operation state as a first operation state when the DRX cycle of the terminal device is the first DRX cycle, wherein the first operation state is used for indicating monitoring the WUS.

3. The method of claim 2, further comprising:
   determining, by the terminal device, a work state of the drx-onDurationTimer at a start time for the first DRX cycle according to the WUS; and
   performing, by the terminal device, an operation corresponding to the work state.

4. The method of claim 3, wherein determining, by the terminal device, the work state of the drx-onDurationTimer at the start time for the first DRX cycle according to the WUS comprises at least one of:
   determining, by the terminal device, the work state as starting the drx-onDurationTimer at the start time for the first DRX cycle, when a first WUS used for indicating that the terminal device wakes up DRX active time is detected by the terminal device;
   determining, by the terminal device, the work state as not starting the drx-onDurationTimer at the start time for the first DRX cycle, when a second WUS used for indicating that the terminal device stays in DRX sleep time is detected by the terminal device; or
   determining, by the terminal device, the work state as not starting the drx-onDuration Timer at the start time for the first DRX cycle, when no WUS is detected by the terminal device.

5. The method of claim 3, further comprising:
   starting, by the terminal device, the drx-onDuration Timer at the time corresponding to the first DRX cycle when the WUS is detected by the terminal device and the WUS is used for indicating that the terminal device wakes up DRX active time; and/or
   not starting, by the terminal device, the drx-onDuration Timer at the time corresponding to the first DRX cycle when the WUS is detected by the terminal device and the WUS is used for indicating that the terminal device does not wake up the DRX active time.

6. The method of claim 3, further comprising:
   determining, by the terminal device, in a present DRX cycle whether to monitor a WUS corresponding to a next DRX cycle.

7. A terminal device, comprising:
   a processor; and
   a memory storing computer programs which, when executed by the processor, are operable with the processor to:
   determine an operation state of a wake-up signal (WUS) according to a type of a discontinuous reception (DRX) cycle; and
   perform an operation corresponding to the operation state;
   wherein the type of the DRX cycle comprises a first DRX cycle and a second DRX cycle;
   wherein the first DRX cycle is longer than the second DRX cycle,
   wherein the processor configured to determine the operation state of the WUS is configured to:
   determine the operation state as a second operation state when the DRX cycle of the terminal device is the second DRX cycle, wherein the second operation state is used for indicating not monitoring the WUS;

wherein the processor is further configured to:
start a drx-onDurationTimer at a start time for the second DRX cycle.

8. The terminal device of claim 7, wherein the computer programs are operable with the processor to:
determine the operation state as a first operation state when the DRX cycle of the terminal device is the first DRX cycle, wherein the first operation state is used for indicating monitoring the WUS.

9. The terminal device of claim 8, wherein the computer programs are further operable with the processor to:
determine a work state of the drx-onDurationTimer at a start time for the first DRX cycle according to the WUS; and
perform an operation corresponding to the work state.

10. The terminal device of claim 9, wherein the computer programs are operable with the processor to:
determine the work state as starting the drx-onDurationTimer at the start time for the first DRX cycle, when a first WUS used for indicating that the terminal device wakes up DRX active time is detected by the terminal device;
determine the work state as not starting the drx-onDurationTimer at the start time for the first DRX cycle, when a second WUS used for indicating that the terminal device stays in DRX sleep time is detected by the terminal device; or
determine the work state as not starting the drx-onDurationTimer at the start time for the first DRX cycle, when no WUS is detected by the terminal device.

11. The terminal device of claim 9, the computer programs are further operable with the processor to:
start the drx-onDurationTimer at the time corresponding to the first DRX cycle when the WUS is detected by the terminal device and the WUS is used for indicating that the terminal device wakes up DRX active time; and/or
not start the drx-onDuration Timer at the time corresponding to the first DRX cycle when the WUS is detected by the terminal device and the WUS is used for indicating that the terminal device does not wake up DRX active time.

12. The terminal device of claim 9, the computer programs are further operable with the processor to:
determine in a present DRX cycle whether to monitor a WUS corresponding to a next DRX cycle.

13. A non-transitory computer readable storage medium configured to store computer programs which are operable with a terminal device to:
determine an operation state of a wake-up signal (WUS) according to a type of a discontinuous reception (DRX) cycle; and
perform an operation corresponding to the operation state;
wherein the type of the DRX cycle comprises a first DRX cycle and a second DRX cycle;
wherein the first DRX cycle is longer than the second DRX cycle;
wherein the computer programs are operable with the terminal device to determine the operation state of the WUS are operable with the terminal device to:
determine the operation state as a second operation state when the DRX cycle of the terminal device is the second DRX cycle, wherein the second operation state is used for indicating not monitoring the WUS;
wherein the computer programs are further operable with the terminal device to:
start a drx-onDurationTimer at a start time for the second DRX cycle.

14. The non-transitory computer readable storage medium of claim 13, wherein the computer programs operable with the terminal device to determine the operation state of the WUS are operable with the terminal device to:
determine the operation state as a first operation state when the DRX cycle of the terminal device is the first DRX cycle, wherein the first operation state is used for indicating monitoring the WUS.

15. The non-transitory computer readable storage medium of claim 14, wherein the computer programs are operable with the terminal device to:
determine a work state of a drx-onDurationTimer at a start time for the first DRX cycle according to the WUS; and
perform an operation corresponding to the work state.

16. The non-transitory computer readable storage medium of claim 15, wherein the computer programs operable with the terminal device to determine the work state of the drx-onDurationTimer at the start time for the first DRX cycle according to the WUS are operable with the terminal device to:
determine the work state as starting the drx-onDurationTimer at the start time for the first DRX cycle, when a first WUS used for indicating that the terminal device wakes up DRX active time is detected by the terminal device;
determine the work state as not starting the drx-onDurationTimer at the start time for the first DRX cycle, when a second WUS used for indicating that the terminal device stays in DRX sleep time is detected by the terminal device; and/or
determine the work state as not starting the drx-onDurationTimer at the start time for the first DRX cycle, when no WUS is detected by the terminal device.

* * * * *